Sept. 1, 1925. 1,552,210
M. E. BUSSLER
FRUIT, VEGETABLE, FISH, AND MEAT DEHYDRATING APPARATUS
Filed Dec. 17, 1920 3 Sheets-Sheet 2

WITNESS:

INVENTOR.

BY

ATTORNEY.

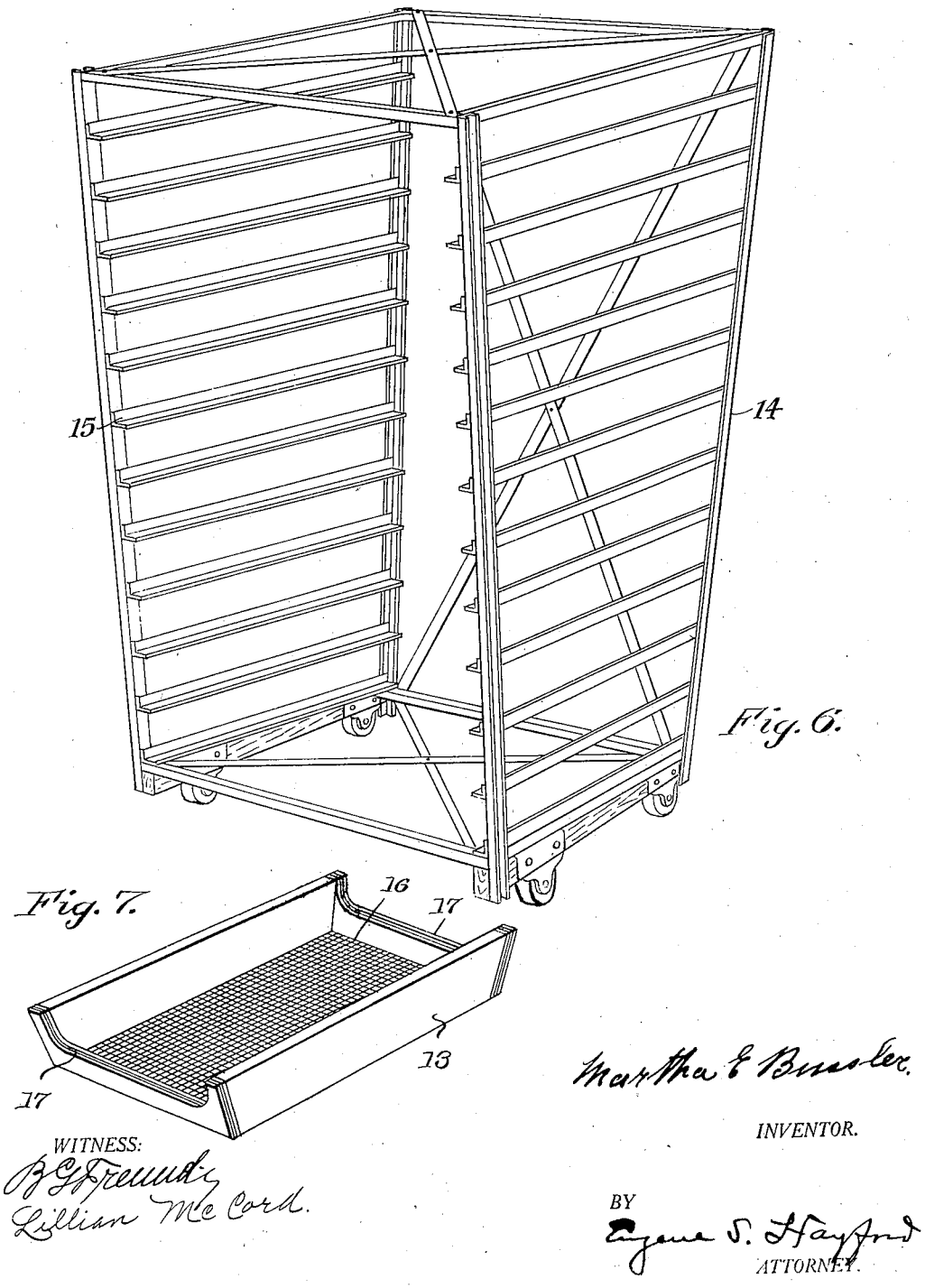

Patented Sept. 1, 1925.

1,552,210

UNITED STATES PATENT OFFICE.

MARTHA E. BUSSLER, OF NEW ORLEANS, LOUISIANA.

FRUIT, VEGETABLE, FISH, AND MEAT DEHYDRATING APPARATUS.

Application filed December 17, 1920. Serial No. 431,394.

*To all whom it may concern:*

Be it known that I, MARTHA E. BUSSLER, a citizen of the United States, residing at New Orleans, in the parish of Orleans and State of Louisiana, have invented certain new and useful Improvements in Fruit, Vegetable, Fish, and Meat Dehydrating Apparatus; and I do hereby declare the following to be a full, clear, and exact description of the invention, such as will enable others skilled in the art to which it appertains to make and use the same.

In the various types of de-hydrators at present in use, the drying or de-hydrating of food products, is accomplished, either by use of heat generated by the sun rays and applied directly to the material to be dried or de-hydrated or by the direct or indirect application of heat from direct heat furnaces, steam coils placed directly in dryers and by indirect steam heating systems as well as other heating agencies. In all of the de-hydrators in present use it has been found that while the materials to be de-hydrated will de-hydrate in certain sections, particularly the top layers of materials in the de-hydrating machines, the bottom or lower layers remain saturated with moisture thereby delaying and preventing the uniform de-hydrating or drying process.

It is an object of this invention to provide eectrically heated drying or de-hydrating unit or units for the uniform de-hydrating of fruits, vegetables, meats and fish and similar products. A further object of this invention is the constructing of a drying unit for de-hydrating fruits, vegetables, meats, fish and other similar food products, said de-hydrating unit having electrically heated heating elements, placed in a heating chamber for the purpose of drying fruits, vegetables, meats and fish, said fruits, vegetables and fish being supported in trays, said trays being arranged in a vertical tier or rack, the said rack being placed within a drying chamber directly above and supported by the said chamber containing the electrical heating elements.

It is a further object of the invention to provide a de-hydrating unit having means for distributing the materials to be de-hydrated on wire mesh or open bottom trays, said trays being arranged in the vertical stack and said trays increasing in size as the trays are so stacked, the bottom tray being much smaller than the top tray, it having been found in practice that food products will de-hydrate much more rapidly in the upper section of de-hydrators than in the lower section.

It is a further object of this invention to provide a movable rack, said rack having means for supporting trays, and said trays having open or wire mesh bottoms, said trays being placed in said rack with a slight angle, towards the back of de-hydrator thereby causing a uniform and positive circulation of warm dry air throughout the de-hydrator.

It is a further object of this invention to provide de-hydrating units having hot air flues extending vertically on each side of the said de-hydrating units, and said flues being connected with a mechanical draft fan.

The invention consists in the details of construction and in the combination and arrangements of the several parts of my dehydrating apparatus, whereby certain important advantages are attained. The dehydrator is simple in construction, and can be built in one or more units, being less expensive and otherwise more efficient and convenient for use, all as will be more fully hereinafter set forth. With these and other objects in view, the invention consists in the novel details of construction and combination of parts more fully hereinafter described, and particularly pointed out in the claims.

In the accompanying drawings forming a part of this application, and in which similar reference symbols indicate corresponding parts in the several views:

Figure 6 shows a perspective view of the de-hydrator rack.

Figure 7 is a perspective view of one of the de-hydrator drying trays.

Figure 1:
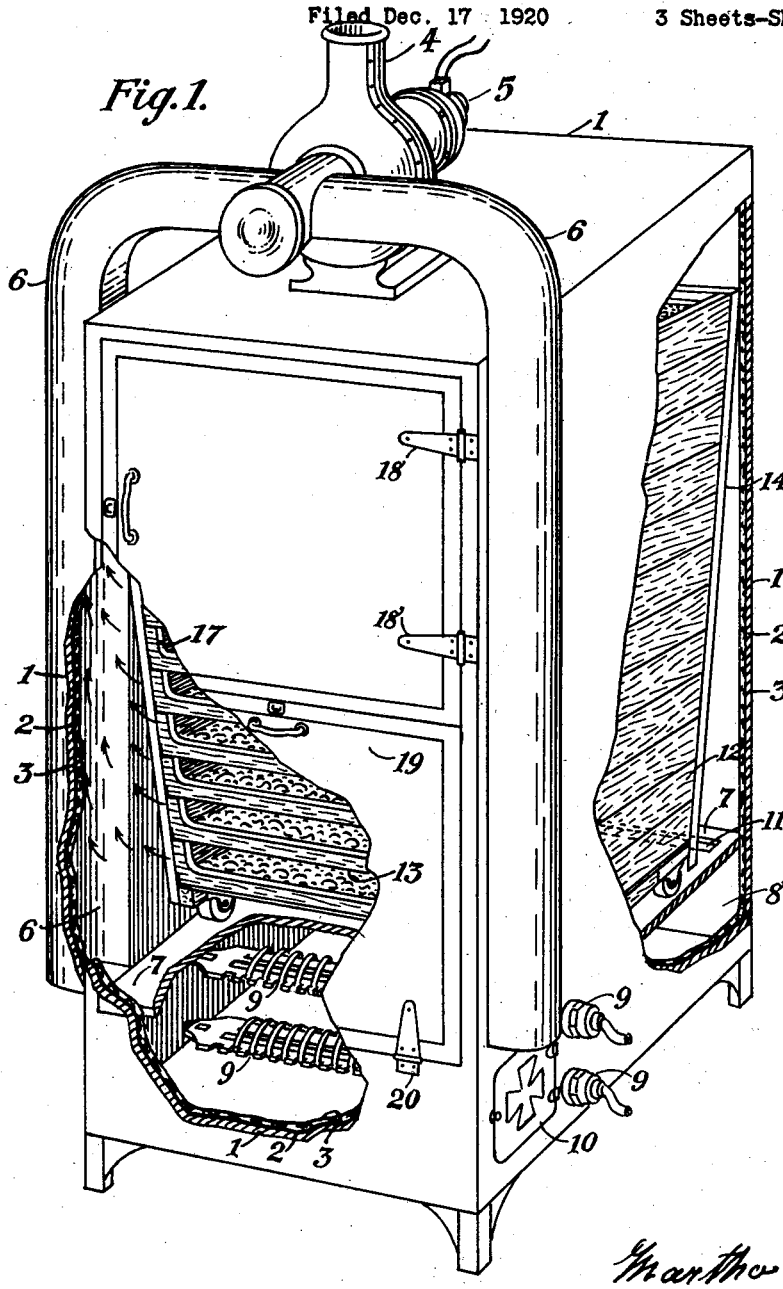
Figure 1 is a perspective view of the dehydrator—part of the doors being broken away, also the side being shown broken away.
Figure 2:
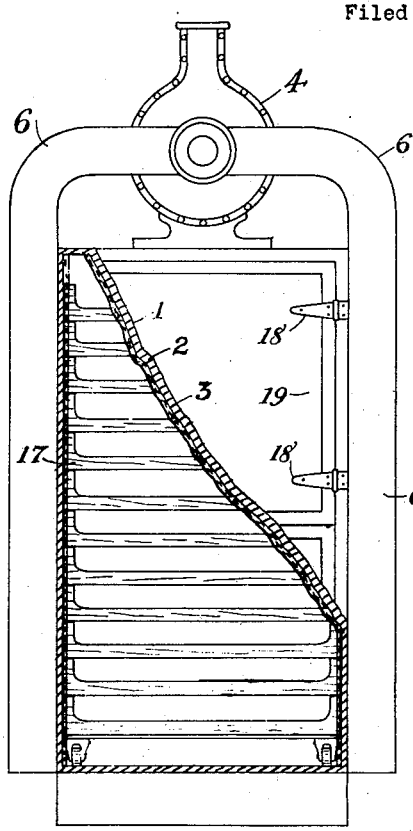
Figure 2 is a front elevation of the dehydrator,—the doors being shown broken away.

Referring to the drawings it will be seen that the de-hydrating units are constructed with insulated walls. Numeral 1 indicates the outer housing or wall of the de-hydrating unit. Numeral 2 represents the intervening insulating wall, same being interposed between the outer wall 1 and the inner wall 3. The inner wall 3 being composed of fibre board or other plastic composition.

Figure 3:
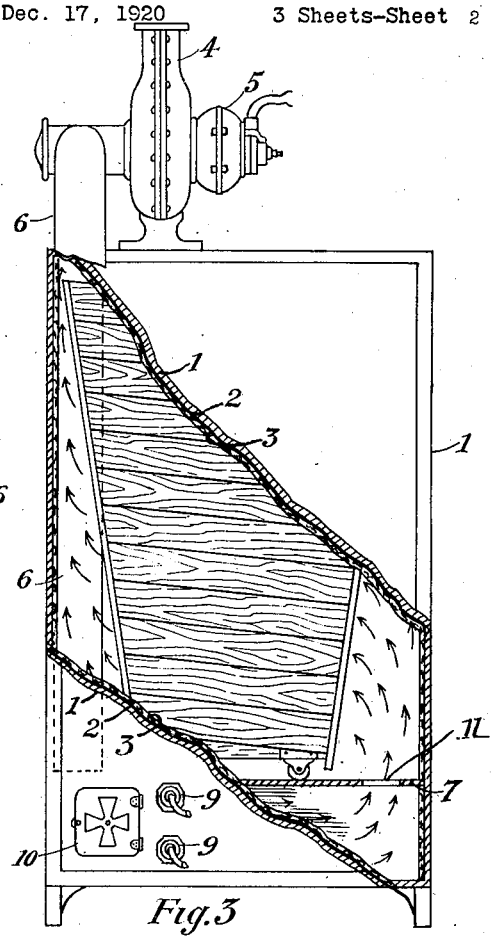
Figure 3 is a side elevation of the dehydrator being shown partly broken away.
Figure 4:
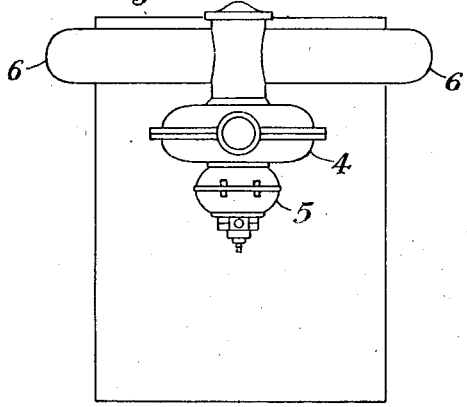
Figure 4 shows a top view of the dehydrator.
Figure 5:
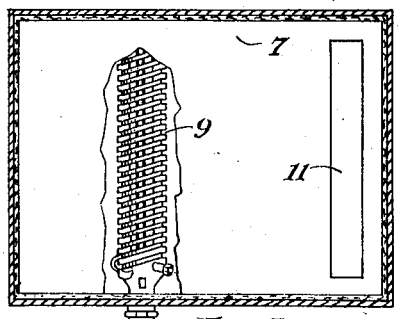
Figure 5 shows a sectional plan view of the de-hydrator at the floor line,—with a portion of the floor cut away to show an electrical heating unit.

The de-hydrator is provided with a suction fan 4, same being driven or rotated by means of the electric motor 5, the said suction fan being connected to the de-hydrating unit by the means of flues 6. The space within the casing of the de-hydrator above a horizontal partition or floor 7 constitutes a de-hydrating chamber. The flues 6 extend downwardly along opposite sides of the de-hydrating chamber to the level of the floor 7 and are in open communication with the interior of the de-hydrating chamber at opposite sides of the latter. The space within the de-hydrator casing beneath the floor 7 constitutes a heating chamber, indicated at 8. Heating units 9 are placed within the heating chamber 8 and secured to the side walls so that cold air passing in through the inlet veins or openings 10, is thereby heated by the said heating elements 9 passing upward through the air duct or passage 11 into the rear of the de-hydrator chamber and then being drawn and distributed by the draft induced by said suction fan 4 through and over the trays passing over the top of the de-hydrating products, finally being drawn or induced into the flues 6 as indicated by the arrows in Figure 1. The open bottom trays 12 are supported on the rack 14, as shown in Figure 1, the said rack 14 being constructed with angle guides or side rails 15, thereby supporting the open bottom trays 12 in such a manner as to afford a free passage of the warm air currents over the top of each tray. The bottoms of the said trays 12 are provided with openings or wire mesh, thereby permitting the warm air currents to come in contact with the de-hydrating products in said trays. The said trays 12 have both ends cut away as shown in Figure 7 so as to provide openings for the ingress and egress of drying fluids, and the said supporting rack 14 is constructed with rails 15 on a slight slant or incline, thereby accelerating the flow of warm air through the trays, as shown by arrows in Figure 1 and Figure 3.

It will be particularly noted that the rack 14 is so constructed with inclined angle iron side rails 15 as to support the trays in such a manner as to provide air passages between said trays, said air passages having a slight elevation towards the front of de-hydrator chamber, thereby causing a positive circulation of the drying fluids. I also provide a rack having the front and rear supporting members inclined inwardly so as to provide for a gradual decrease in the length of supporting side rails 15 and a consequent shortening of the warm air or drying fluid passages in the lower tiers of trays, thereby creating a uniform current of drying fluids between all the trays in the rack.

I construct my trays as shown by the perspective view Figure 7, said trays having wire mesh bottoms 16 and having ends cut away to admit warm air, as indicated at 17 in Figs. 1 and 7. The front wall of the de-hydrator casing includes an upper door supported on hinges 18 to swing horizontally and a lower door 19 supported on hinges 20 to swing vertically. These doors afford access to the de-hydrating chamber.

From the foregoing description it is thought to be obvious that a de-hydrating apparatus constructed in accordance with my invention is of an extremely simple and comparatively inexpensive construction, and is particularly well adapted for domestic or commercial use by reason of the convenience and facility with which it may be assembled and handled. It will also be obvious that my invention is susceptible of slight modifications without material and radical departure from the principles and spirit thereof, and for this reason I do not wish to be understood as particularly limiting myself to the precise arrangement and formation of the various parts herein shown in carryng out my invention.

The said battering or inclining of the ends of the said truck or rack forms an inverted V-shaped air space within said de-hydrator, said inverted V-shaped air space of passage having its greatest area at the bottom of said de-hydrator, thereby causing and permitting the heating fluids to expand after passing through the air duct or passage 11, thus tending to cause a uniform distribution of the warm air or drying fluid through the de-hydrating products contained in my said de-hydrator. It has been found in practice that it is much more difficult to de-hydrate materials or products supported or arranged in the bottom portion of de-hydrating chambers than in the upper portions, and that by my arrangement I have perfected a de-hydrator that will uniformly de-hydrate all fruit, vegetables, meat and fish products.

Having thus described my invention, what I claim as new, and desire to secure by Letters Patent is:—

1. In a dehydrator, a dehydrating chamber having a pair of lateral outlet ports and having an inlet port at the lower end of the dehydrating chamber, and means for supporting articles which are to be dehydrated within said dehydrating chamber in the path of air currents from said inlet port to said outlet ports.

2. In a dehydrator, a dehydrating chamber having an inlet port in the floor thereof leading through the rear wall thereof and having a lateral outlet port located adjacent to the front wall thereof and extending in communication with the interior of the chamber from the level of the floor thereof for the greater part of the height of the chamber.

3. In a dehydrator, a dehydrating chamber having an inlet port in the floor thereof adjacent to the rear wall thereof and having a lateral outlet port located adjacent to the front wall thereof and extending in communication with the interior of the chamber from the level of the floor thereof for the greater part of the height of the chamber, and means for supporting articles which are to be dehydrated within said dehydrating chamber in the path of air currents which will extend from said inlet port to said outlet port.

4. In a dehydrator, a dehydrating chamber having an inlet port in the floor thereof adjacent to the rear wall thereof and having a lateral outlet port located adjacent to the front wall thereof and extending in communication with the interior of the chamber from the level of the floor thereof for the greater part of the height of the chamber, means for supporting articles which are to be dehydrated within said dehydrating chamber in the path of air currents which will pass from said inlet port to said outlet port, and a suction causing means connected operatively with said outlet port.

5. In a dehydrator, a dehydrating chamber having an inlet port at the lower end thereof and having a lateral outlet port spaced from the inlet port, means for heating the air which is permitted to enter said dehydrating chamber through said inlet port, means located exteriorly of said dehydrating chamber for causing a suction on said outlet port, and means for supporting articles which are to be dehydrated within said dehydrating chamber in the path of air currents passing from said inlet port to said outlet port.

6. In a dehydrator, a dehydrating chamber having an inlet port at the lower end thereof and having a lateral outlet port spaced from the inlet port, means for heating the air which is permitted to enter said dehydrating chamber through said inlet port, means located exteriorly of said dehydrating chamber for causing a suction on said outlet port, and a rack disposed within said dehydrating chamber in the path of air currents from the inlet port to the outlet port, said rack being adapted to support a series of superposed trays for supporting articles which are to be dehydrated.

7. In a dehydrator, a dehydrating chamber having an inlet port at the lower end thereof and having a lateral outlet port spaced from the inlet port, means for heating the air which is permitted to enter said dehydrating chamber through said inlet port, means located exteriorly of said dehydrating chamber for causing a suction on said outlet port, a rack disposed within said dehydrating chamber in the path of air currents from the inlet port to the outlet port, said rack having vertically spaced pairs of inclined rails adapted to support a series of superposed trays for supporting articles which are to be dehydrated, each of said trays having foraminous bottoms.

8. In a dehydrator, a dehydrating chamber having an inlet port at the lower end thereof and having a lateral outlet port spaced from the inlet port, means for heating the air which is permitted to enter said dehydrating chamber through said inlet port, means located exteriorly of said dehydrating chamber for causing a suction on said outlet port, a rack disposed within said dehydrating chamber in the path of air currents from the inlet port to the outlet port, said rack being adapted to support a series of superposed trays for supporting articles which are to be dehydrated, each of said trays having foraminous bottoms, and having the end walls thereof oppositely inclined and partially cut away at their upper edges, said trays increasing in length from the lowermost tray of the series uniformly toward the upper end of the series.

9. In a dehydrator, a casing, a horizontal partition in the casing dividing the space therewithin into an upper chamber and a lower chamber, said horizontal partition having an opening in the rear portion thereof for establishing communication between said chamber, said lower chamber having a lateral air intake port located adjacent to the front wall thereof and said upper chamber also having a lateral outlet port located adjacent to the front wall thereof and extending from the level of said horizontal partition vertically and in communication with the interior of the upper chamber for the greater part of the height of the latter, a source of heat within said lower chamber, and a means located exteriorly of the casing and in communication with the outlet port of the upper chamber for causing a suction on the latter.

In testimony whereof I have hereunto signed my name.

MARTHA E. BUSSLER.